No. 697,838. Patented Apr. 15, 1902.
A. GRAY.
APPARATUS FOR PURIFYING WATER FOR STEAM GENERATORS.
(Application filed Sept. 12, 1901.)
(No Model.) 2 Sheets—Sheet 1.
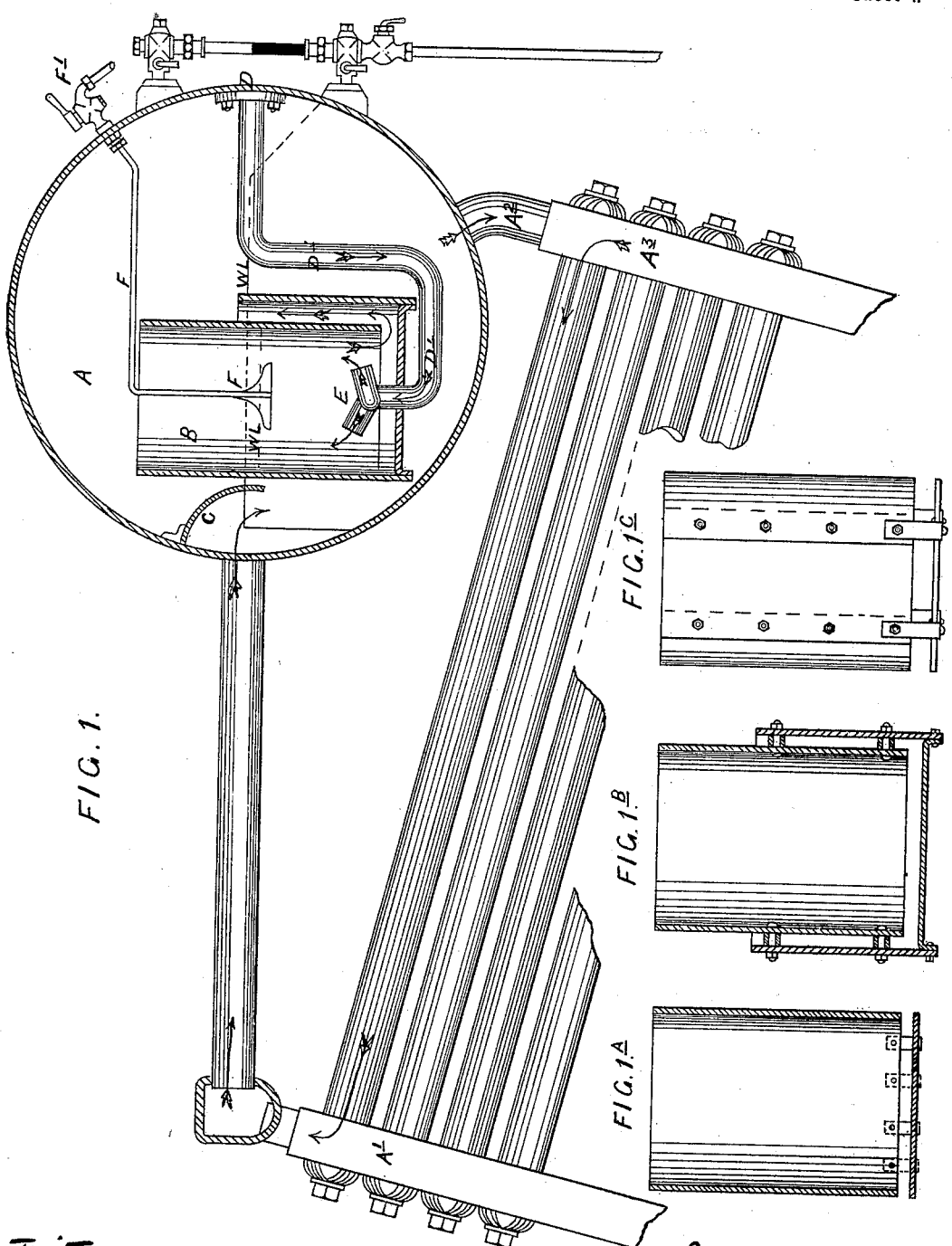

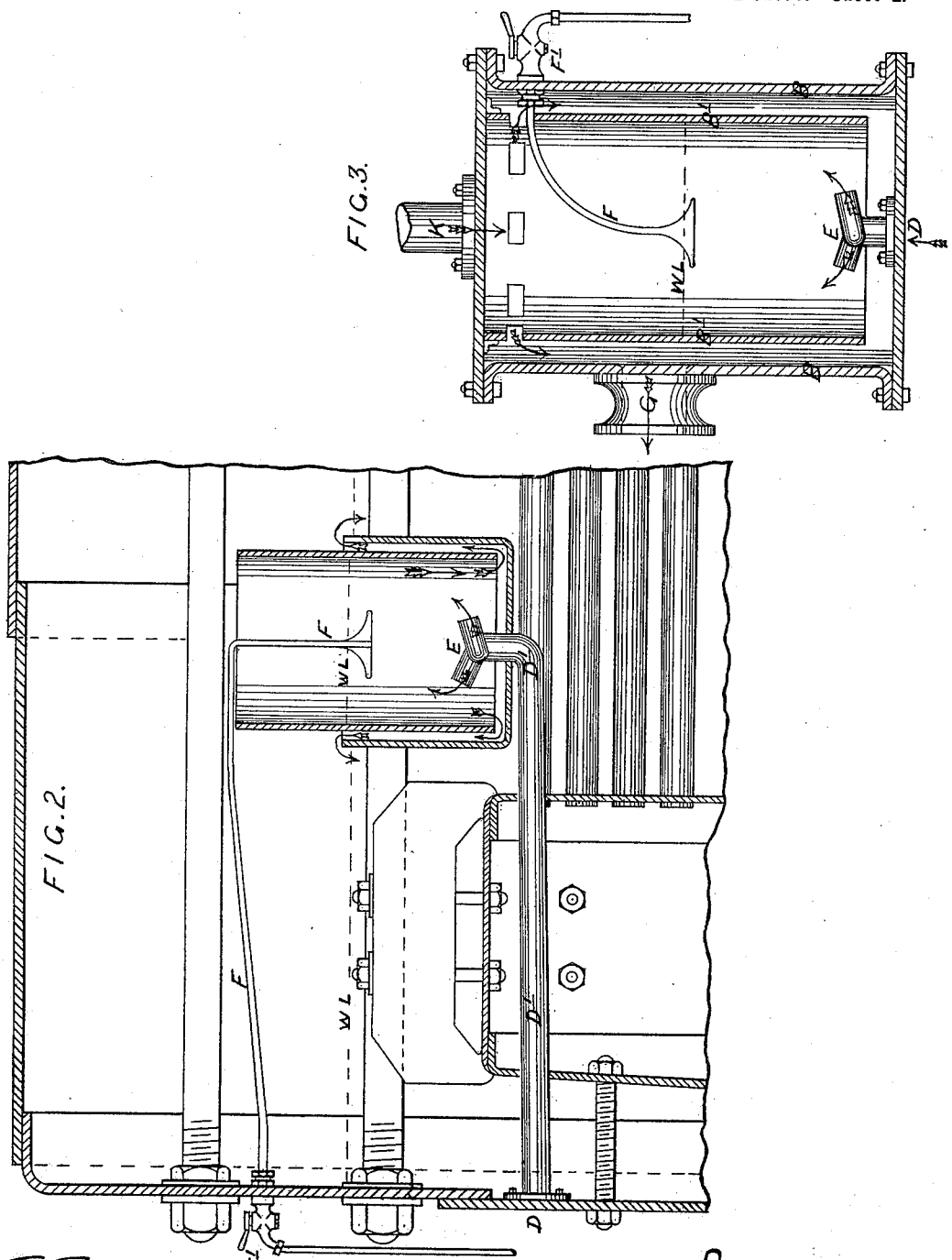

UNITED STATES PATENT OFFICE.

ALEXANDER GRAY, OF NEWCASTLE-UPON-TYNE, ENGLAND, ASSIGNOR OF ONE-HALF TO THOMAS THOMPSON, OF BLACKHEATH, ENGLAND.

APPARATUS FOR PURIFYING WATER FOR STEAM-GENERATORS.

SPECIFICATION forming part of Letters Patent No. 697,838, dated April 15, 1902.

Application filed September 12, 1901. Serial No. 75,165. (No model.)

*To all whom it may concern:*

Be it known that I, ALEXANDER GRAY, consulting engineer, a subject of the King of Great Britain and Ireland, residing at 1 South Parade, Newcastle-upon-Tyne, England, have invented certain new and useful Improvements in Apparatus for Purifying Water for Steam-Generators; and I do hereby declare the following to be a full, clear, and exact description of the invention, such as will enable others skilled in the art to which it appertains to make and use the same.

The primary object of my invention is to remove from the feed-water produced from condensed steam the oil or other impurities which it invariably contains before it is again evaporated into steam in the boiler, and, further, to cause any solid foreign substances held in suspension in the feed-water to be expelled with the oil, at the same time liberating the air into the steam-space.

My invention may be applied to any form of boiler; but as it is especially adapted to water-tube boilers of any of the well-known types I will so describe it.

The apparatus will be preferably entirely contained in the steam and water space or drum into which the evaporating-tubes deliver; but it may be fitted to suit special circumstances in a separate vessel between the feed-pump and the boiler. It consists of a vessel fitted inside the boiler or being separate therefrom, into which the feed-water is delivered by a feed-nozzle, in which nozzle is provided an arrangement for causing the feed-water to have a whirling motion given to it as it is delivered by the feed-pump to the water-drum, the object of which is to keep the surface of the water on which the oil or other impurities are floating in constant agitation. Above the feed-nozzle and just below the water-level is a pipe, forming part of a scumming apparatus, leading outside to any suitable receptacle or overboard. The vessel which surrounds the feed-nozzle and the mouth of the scum-pipe will preferably be of cylindrical form suspended vertically, the lower part submerged in the water and the upper part in the steam-space, so as to keep separate the entering feed-water in agitation from mixing among the steam mixed with water entering from the evaporating-tubes, and may be open at both ends or partially closed at the lower end or entirely closed at the bottom, with one or more pipes or passages up the sides giving fixed water-level in vessel irrespective of level in boiler, and it may also be partly closed at top. The feed-pipe from the pump and the surface scum or oil discharge may all be fitted with regulating cocks or valves, to be opened or closed, as required, and with a water-gage to show the water-level. I have found that oil or other impurities mixed with the water of condensed steam, also impurities in spring and sea water, if kept in constant agitation or circulation and subjected to a high temperature, rise to the surface and are readily collected by the scumming apparatus, and thus blown out.

Figure 1, Sheet 1, shows the upper portion of a water-tube boiler, such as of the "Babcock" type, in which the water mixed with steam after traversing the tubes is delivered into a cylindrical steam and water drum in which is placed the purifying apparatus. Figs. $1^A$, $1^B$, and $1^C$ show different methods of construction of the purifying vessel. Fig. 2, Sheet 2, shows the application to an ordinary multitubular marine boiler. Fig. 3 shows a somewhat modified form of my invention.

Referring to Fig. 1, the apparatus is fitted within the steam and water drum A, into which the steam and water mixed is delivered from the front header by the horizontal pipe and diverted downward by the curved plate C. B is the purifying apparatus, open at top above the water-level WL and shown closed at bottom with a surrounding casing, as shown by Fig. $1^B$, with a casing or partial casing, as shown on Fig. 1, open just about the normal water-level with a closed bottom, or it may be with the bottom partially closed by a plate, as in Fig. $1^A$. This vertical vessel B is supported within the steam and water drum A and will preferably be made in pieces, as shown by Fig. $1^C$, Sheet 1, to pass through the manhole and be put together inside. The feed-water from the pump enters at D and passes down the pipe D' into the drum B. The top of the pipe D' is formed with two or more nozzles E, branching radially, and may incline upward, in passing through which a whirling motion is given to the water, or instead of this I may use a small fixed turbine with inclined blades to effect the same object. F is the scum-pipe, fitted with a cock F'.

In Fig. 2, Sheet 2, the apparatus is fitted above the fire-tubes in the water and steam space supported upon the stays, the construction and operation being similar.

In boilers where there is no combined steam and water drum suitable to receive the apparatus I propose to fit it in a separate drum, as shown by Fig. 3, Sheet 2, outside of and separate from the main boiler, (either horizontal or vertical,) in which B is the purifier, comprising an internal casing B', perforated at top, D the feed-inlet, G the feed-outlet, K a pipe to admit steam from the boiler, and F the scum-pipe, fitted with cock F'. Into this separate vessel, which is in connection with the main boiler steam and water spaces, as described, the feed-water will be pumped and after being purified and partially heated will pass into the boiler.

The purifying apparatus in either form is practically automatic in its action, only requiring the scum-cock to be opened at proper intervals, depending upon the original impurity of the water.

I declare that what I claim is—

1. In a feed-water purifier, the combination of a vessel, a feed-water inlet at the bottom thereof, a blow-off pipe opening into the upper portion of said vessel, said vessel having an opening at the top communicating with the steam-space of the boiler, and a water-outlet in said vessel for delivering the feed-water to the boiler.

2. In a feed-water purifier, the combination of a vessel, a feed-water inlet at the bottom thereof, said vessel being adapted to be partially submerged in the boiler, an opening in said vessel communicating with the steam-space of the boiler, a feed-water outlet, and a blow-off outlet depending into said vessel below the water-line thereof.

3. In a feed-water purifier, the combination of a vessel, a feed-water inlet, a feed-water outlet entering the bottom of said vessel, a passage adapted to form communication between said vessel and the steam-space of a boiler, radially-disposed nozzles connected to said feed-water inlet, and a blow-off pipe depending into said vessel.

4. In a feed-water purifier, the combination of a vessel, a casing upon the outside of said vessel, a feed-water inlet passing through said casing and entering the bottom of said vessel, radially-disposed nozzles connected to said feed-water inlet, a passage adapted to form communication between said vessel and the steam-space of a boiler, and a blow-off pipe having its opening in the upper part of said vessel adapted to carry off the scum and other impurities.

5. In a feed-water purifier, the combination with a boiler, of a casing in communication with the water-space within the boiler, a vessel connected to said casing, in communication with the steam-chamber of the boiler, a feed-water pipe entering the bottom of said vessel, and a blow-off pipe having its opening in the upper part of said vessel adapted to carry off the scum from the feed-water, substantially as described.

6. An apparatus for purifying feed-water and liberating the air therefrom in steam-generators in which the feed-water of condensed steam entering the boiler passes into the apparatus comprising in combination a vessel partly submerged below the water-level and partly rising into the steam-space, with an open top and a closed bottom, through which is inserted an internal pipe connected with the feed-pipe fitted with a nozzle by which the impure water has a whirling agitation imparted to it, causing the oil, greasy or other impurities, to be deposited upon the surface of the water in the purifier and prevented from mixing with the rest of the boiler-water, and a scumming-pipe for blowing off said deposit; substantially as described.

In testimony whereof I affix my signature in presence of two witnesses.

ALEXANDER GRAY.

Witnesses:
JOHN T. GRAY,
WILLIAM DAGGETT.